(12) United States Patent
Gupte et al.

(10) Patent No.: US 6,981,130 B2
(45) Date of Patent: Dec. 27, 2005

(54) FORWARDING THE RESULTS OF OPERATIONS TO DEPENDENT INSTRUCTIONS MORE QUICKLY VIA MULTIPLEXERS WORKING IN PARALLEL

(75) Inventors: Ajit D. Gupte, Pune (IN); Amitabh Menon, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 514 days.

(21) Appl. No.: 10/196,822

(22) Filed: Jul. 17, 2002

(65) Prior Publication Data

US 2003/0061468 A1    Mar. 27, 2003

Related U.S. Application Data

(60) Provisional application No. 60/324,288, filed on Sep. 25, 2001.

(51) Int. Cl.[7] .............................................. G06F 15/00
(52) U.S. Cl. ...................... 712/218; 712/216; 712/217; 712/219
(58) Field of Search ................................ 712/216, 217, 712/218, 219

(56) References Cited

U.S. PATENT DOCUMENTS 5,526,496 A * 6/1996 Alnuweiri ................... 710/125
5,826,055 A * 10/1998 Wang et al. ................. 712/218
6,038,653 A * 3/2000 Nguyen et al. ............... 712/23
6,266,766 B1 * 7/2001 O'Connor .................... 712/217
6,430,679 B1 * 8/2002 Heeb ........................... 712/218

OTHER PUBLICATIONS

Hennessy and Patterson. Computer Organization and Design, Morgan Kaufmann Publishers, Inc. 1998. pp. 452, 480 and 482.*

* cited by examiner

Primary Examiner—Eddie Chan
Assistant Examiner—Kevin P. Rizzuto
(74) Attorney, Agent, or Firm—Robert D. Marshall, Jr.; W. James Brady, III; Frederick J. Telecky, Jr.

(57) ABSTRACT

Multiple register input multiplexors select a respective one of the results generated by operation units, and store the selected results in respective architecture registers as specified by the corresponding instructions (from which the results are generated). A forwarding multiplexor receives the results before the results are provided to the register input multiplexors, and selects one of the results for use as an operand for execution of a dependent instruction. As the forwarding multiplexor receives the results at a point before the inputs of the register input multiplexors, the time duration required to forward the results may be minimized, and a greater instruction throughput performance may be attained in a processor.

12 Claims, 4 Drawing Sheets

FORWARDING THE RESULTS OF OPERATIONS TO DEPENDENT INSTRUCTIONS MORE QUICKLY VIA MULTIPLEXERS WORKING IN PARALLEL

This application claims priority under 35 USC §119(e)(1) of Provisional Application No. 60/324,288, filed Sep. 25, 2001.

BACKGROUND OF THE INVENTION

1. Field of the Invention

The present invention relates to processor architectures, and more specifically to a method and apparatus for forwarding quickly the results of operations to corresponding dependent instructions.

2. Related Art

Results of execution of instructions are often provided to other instructions. For example, assume instruction (1) performs operation A=B+C and instruction (2) performs operations E=A*F, wherein + and * respectively represent an addition and multiplication operation. The result (A) of instruction (1) is to be provided as an operand to instruction (2). Accordingly, instructions (1) and (2) may termed as providing instruction and a dependent instruction respectively.

Instruction dependencies, such as the one noted above, introduce a sequential order in the execution of instructions. That is, instruction (2) can execute only after the result of instruction (1) is available. At least to increase the instruction throughput performance (i.e., number of instructions executed in a specific duration of time), it is generally necessary to provide results of providing instructions to the corresponding dependent instructions quickly.

In one prior environment, the variable A, B, C, E, and F of the above example represent programmer accessible registers, and the result of instruction (1) is provided to instruction (2) only after the result of addition is stored in register A. As a consequence, delay exists between the beginning of execution of instruction (2) and the availability of the result of instruction (1). The delays may reduce the overall instruction throughput performance, and may thus be undesirable.

Another prior environment partially overcomes the throughput problem by providing the result to instruction (2) before storing in register A. In such an environment, a multiplexor is used associated with each of the registers, with each multiplexor selecting one result from the results generated by many operation units (e.g., adder and multiplier in the above example). Thus, the output of each multiplexor is stored in the corresponding register.

Before completing storing of the results in architecture registers, a result at the output of the multiplexor may be provided to an operation unit executing the corresponding dependent instruction, and is often referred to as data forwarding. Another multiplexor may be used to select from among the outputs of the multiplexors storing to the respective registers, and the selected output is forwarded as an operand for the dependent instruction. Due to such forwarding, a dependent instruction can be executed without having to wait for a prior result to be stored.

One problem with the such an approach is that the presence of the two multiplexors (one used for selection of operand to store in architecture registers and another used for data forwarding) may lead to unacceptably long propagation delays. The delays may in turn impede the instruction throughput performance. Accordingly, what is needed is a method and apparatus which enables the results of operations to be quickly forwarded to the corresponding dependent instructions.

SUMMARY OF THE INVENTION

The present invention minimizes the time required to determine any results of execution to be forwarded as operands by using a forwarding multiplexor which receives results of execution of instructions directly from execution units. A register input multiplexor, which determines the (any) specific result to store in a corresponding architecture register, may receive the results in parallel.

As the register input multiplexor is not in the path of the results to the forwarding multiplexor, operands may be forwarded quickly to the corresponding dependent instructions. The instruction throughput performance of a processor may thus be enhanced in accordance with the present invention.

In one embodiment, an execution unit contains multiple operation units each executing multiple instructions to generate multiple results as outputs. Each instruction may specify one or more of multiple architecture registers (accessible to a programmer in an embodiment) to store the corresponding result(s). A register input multiplexor may select one of the results for storing in the corresponding architecture register as specified by the instruction generating the result.

A forwarding multiplexor receives the results at points located between the outputs of the execution units and the inputs of the register input multiplexor, and selectively forwards one of the results to a connected one of the operation units. As the register input multiplexor is not in the forwarding path, the time duration for forwarding may be minimized. In an embodiment, a forwarding multiplexor is maintained for each operand which may require forwarding.

The execution unit may also contain multiple temporary storage registers each storing a corresponding one of the multiple results and providing the result to the multiple forwarding multiplexors and the register input multiplexors. To facilitate either the forwarded results or non-forwarded data (e.g., from the architecture registers directly) as operands on the same path to the operation units, the execution unit may contain multiple (one per forwarded operand) operand multiplexors, with each operand multiplexor selectively providing either a non-forwarded data or a forwarded result to a connected one of the operation units.

A control logic may be implemented to coordinate the selection by various multiplexors to ensure the operands are provided accurately according to the dependencies specified by instructions. In one embodiment, the control logic maintains a first record and a second record to enable forwarding in accordance with the present invention. The manner in which each record can be used is described below.

A first (type of) record is associated with each one of the operands which may need forwarding. The first record indicates the source (identifier of an architecture register) of the operand. A second (type of) record is associated with each execution unit. The second record indicates the specific architecture register into which the result of execution of an instruction would be stored in each clock cycle.

The control logic causes a forwarding multiplexor associated with an operand to forward a result generated by an operation unit if the architecture register indicated by the first record associated with the operand is the same as the architecture register indicated by the second record associated with the operation unit.

The first record and the second record may be populated when the corresponding instructions are decoded and scheduled for execution. In a pipelined approach in which an instruction is processed in multiple clock cycles, the control logic may maintain multiple instances of second records to account for the number of clock cycles. Each instance corresponds to a specific one of the clock cycles in which instructions are scheduled ahead.

The execution unit may also contain a delay block that delays the control value provided to any one of the forwarding multiplexors, when a corresponding one of the multiple operation units execute a multi-cycle providing instruction consuming more cycles to execute. Alternatively, additional instances of the second records may be maintained to support instructions requiring more clock cycles.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An embodiment of the present invention determines a result of an instruction to be forwarded to a dependent instruction using a single multiplexor. The determined result can immediately be forwarded to the dependent instruction. As a single multiplexor is used, the propagation delays during the forwarding may be minimized, and the instruction throughput performance may thus be enhanced.

The advantages of the present invention can be appreciated by first understanding the delays present in a prior approach. Accordingly, a prior approach is described first.

2. Prior Approach

Figure 1:
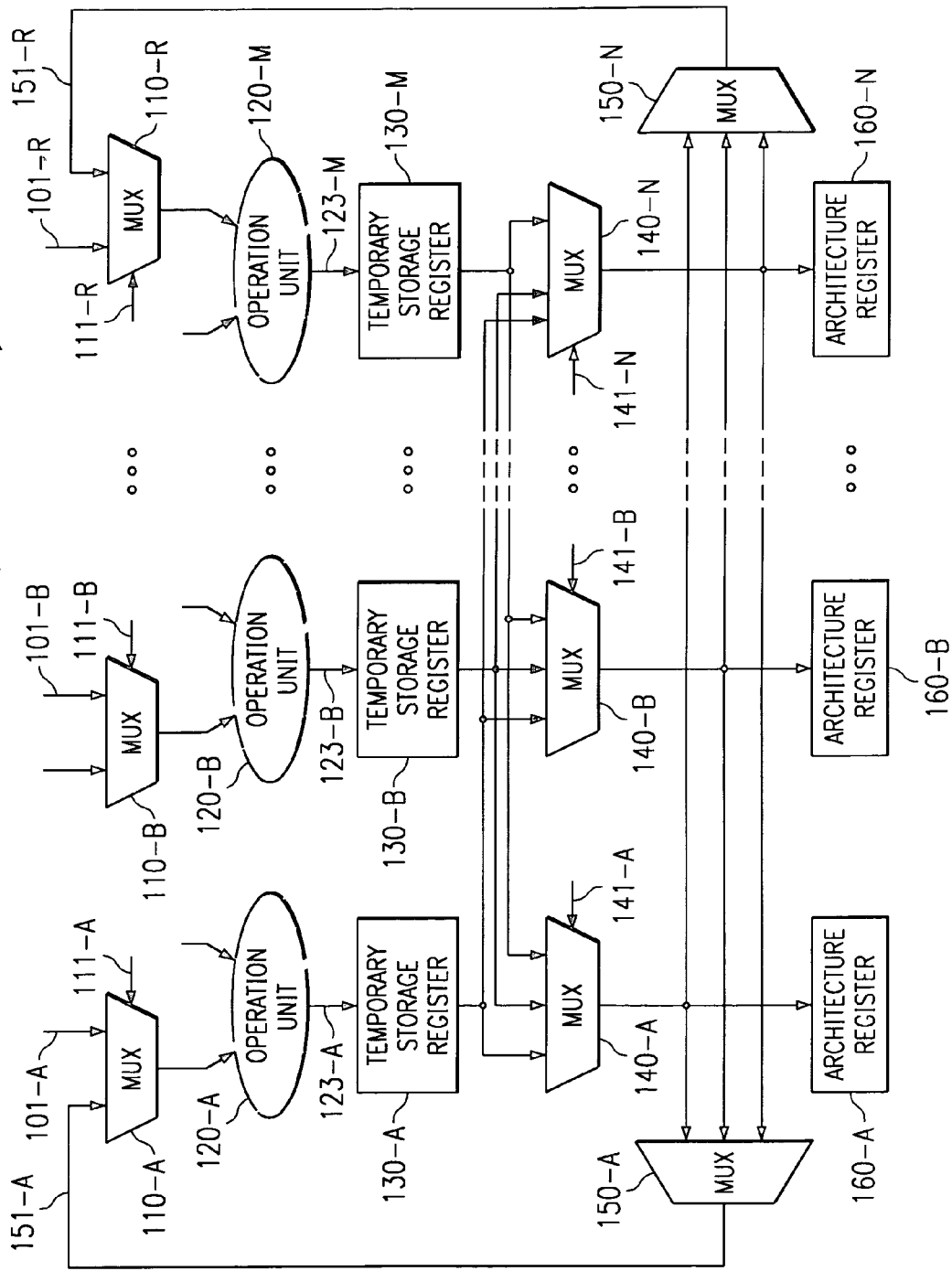
FIG. 1 is a block diagram illustrating an embodiment of an execution unit implementing data forwarding.

FIG. 1 is a block diagram illustrating the details of an embodiment of execution unit 100. Execution unit 100 is shown containing multiplexors 110-A through 110-R, operation units 120-A through 120-M, temporary storage registers 130-A through 130-M, multiplexors 140-A through 140-N and 150-A through 150-R, architecture registers 160-A through 160-N. Each component is described below in further detail.

Multiplexors 110-A through 110-R are described with reference to multiplexor 110-A only for conciseness. Similarly, operation units 120-A through 120-M, temporary storage registers 130-A through 130-M, multiplexor 140-A through 140-M and 150-A through 150-R are respectively described with reference to operation unit 120-A, temporary storage register 130-A, multiplexor 140-A and multiplexor 150-A. Not all the interconnections of the components are shown for clarity.

Multiplexor 110-A receives a normal (i.e., non-forwarded) operand (e.g., from another architecture register or external memory) on path 101-A or the forwarded result on path 151-A. Control signal 111-A determines which one of the two inputs is selected by multiplexor 110-A. In general, the scheduling of execution of instructions is coordinated by control of, among others, multiplexors 110-A through 110-R using the respective control signals 111-A through 111-M. In an embodiment, each operation unit 120-A can have up to three operands forwarded, and accordingly R represents the total number of operands designed for forwarding.

Each of the operation units 120-A through 120-M performs a respective one of the operations (e.g., addition, multiplication, etc.) on multiple operands, and provides the corresponding result on paths 123-A through 123-M respectively. In an embodiment, up to three operands can be forwarded to an operation unit. Operation units 120-A through 120-M may be implemented in a known way.

Temporary storage registers 130-A through 130-M store the results on paths 123-A through 123-M respectively. Thus, the results of execution of operations in operation units 120-A through 120-M are stored in the corresponding temporary storage registers 130-A through 130-M. All the results in temporary storage registers 130-A through 130-M may be provided as inputs to each of multiplexors 140-A through 140-N.

Multiplexor 140-A selects one of the M results provided by temporary storage registers 130-A through 130-M under the control of control value 141-A. In general, control values 141-A through 141-N determine the specific one of the results to be stored in the connected one of the architecture registers 160-A through 160-N. Thus, the output of multiplexor 140-A contains a result (generally generated in the previous clock cycle) which is to be stored in architecture register 160-A.

Multiplexor 150-A selects one of the N-outputs of multiplexors 140-A through 140-N. The selected value is immediately provided (via multiplexor 110-A) for execution of a dependent instruction scheduled for execution in operation unit 120-A. Thus, the result can be forwarded to dependent instructions before being stored in the architecture registers.

From the above, it may be appreciated that two multiplexors (one of multiplexors 140-A through 140-N and one of 150-A through 150-R) are used to determine the result to be forwarded to a dependent instruction. As described below, the determination can be performed using a single multiplexor.

The invention is described with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

3. Present Approach

Figure 2:
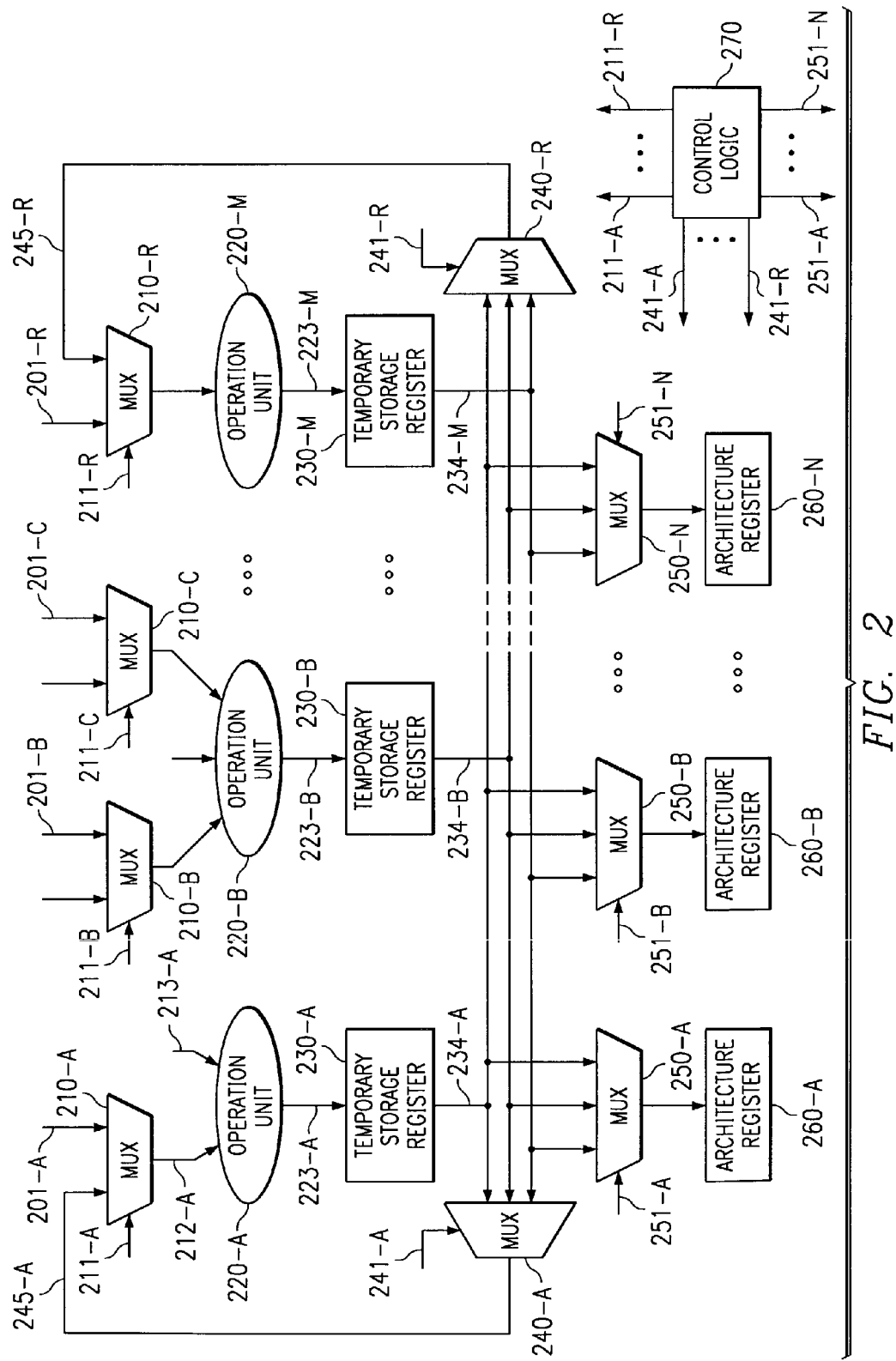
FIG. 2 is a block diagram illustrating an embodiment of an execution unit implemented in accordance with the present invention.

FIG. 2 is a block diagram illustrating the details of an embodiment of execution unit 200 implemented in accordance with the present invention. Execution unit 200 is shown containing operand multiplexors 210-A through 210-R, operation units 220-A through 220-M, temporary storage registers 230-A through 230-M, forwarding multiplexors 240-A through 240-R and register input multiplexors 250-A through 250-N, architecture registers 260-A through 260-N, and control logic 270. Each component is described in detail below.

Operand multiplexors 210-A through 210-R are described substantially with reference to operand multiplexor 210-A only for conciseness. Similarly, operation units 220-A through 220-M, temporary storage registers 230-A through 230-M, forwarding multiplexors 240-A through 240-R and register input multiplexors 250-A through 250-M are respectively described substantially with reference to operation unit 220-A, temporary storage register 230-A, forwarding multiplexor 240-A and register input multiplexor 250-A. All the interconnections are also not shown for clarity.

Operand multiplexor 210-A selects either normal (non-forwarded) operand (e.g., directly from architecture registers) on path 201-A or forwarded result on path 245-A depending on control signal 211-A. The selected input is provided as an operand to operation unit 220-A. Control signal is controlled by control logic 270 as described below.

Operation unit 220-A may perform one of the operations such as addition, multiplication, etc., on the inputs received on paths 212-A and 213-A and generate corresponding on output paths 223-A through 223-M. Temporary storage registers 230-A through 230-M may store the result of the operation performed by operation units 220-A through 220-M respectively.

Register input multiplexors 250-A selects one of results available in temporary registers 230-A through 230-M according to control value 251-A. The selected result is stored in architecture register 260-A. Control value 251-A is generated by control logic 270 and determined based on the corresponding instruction. Thus, the output of register input multiplexors 250-A represents the value to be stored in architecture register 260-A.

Architecture registers 260-A through 260-N store the respective results provided by register input multiplexors 250-A through 250-N. The architecture registers are available to (accessible by) a programmer, and an instruction may specify the architecture register where a generated result is to be stored. Architecture registers may accordingly be termed as programmer accessible registers.

Forwarding multiplexor 240-A selects one of the results generated by operation units 220-A through 220-M (received on lines 234-A through 234-M respectively), and forwards the selected result as an operand for a dependent instruction scheduled for immediate execution in operation unit 220-A. The specific result selected depends on control value 241-A provided by control logic 270. As described below in detail, control logic 270 may be designed to control different components to cause appropriate results to be forwarded as operands.

Control logic 270 provides the control values/signals to the various multiplexors to cause the instructions to be executed consistent with the sequential order imposed by data dependencies. The manner in which control logic 270 may operate is described below in further detail.

4. Control Logic

In general, control logic 270 needs to be implemented consistent with the scheduling of various instructions and the dependencies. In one embodiment, operation unit 220-A executes and stores a result in temporary register 230-A in one (first) clock cycle, the result is stored in the corresponding architecture register in the next (second) clock cycle, and the data in architecture registers is provided as an operand in the following (third) clock cycle.

By using pipeline principles and various aspects of the present invention, an instruction throughput performance of 1 per clock cycle can be maintained even if a dependent instruction is scheduled for execution in the very next clock cycle after the corresponding operand is available. Such a result may be attained while keeping the clock period low (short) by using various aspects of the present invention.

To facilitate data forwarding, two types of records may be maintained within control logic—source records and destination records. In general, the source and destination records are employed to specify the results to be forwarded for immediate execution of the dependent instructions. A destination record indicates the specific architecture register into which the result of an instruction executed by an execution unit will be stored.

A source record indicates the source of an operand. According to a convention, the specific result is identified by (an identifier of) the architecture register in which the result would be stored. The manner in which the source and destination records are used is described below.

The selection of operand multiplexors 210-A through 210-R and forwarding multiplexors 240-A through 240-R are controlled consistent with the source and destination records. Register input multiplexors 250-A through 250-M are controlled according to the destination records. The two types of records are populated while the instructions are scheduled. The manner in which the records may be populated and used for controlling the multiplexors is described below with examples.

As noted above, the destination records specify the destination register of each result obtained by the execution of instructions by operation units 220-A through 220-M respectively. In an embodiment a number of destination records equaling the number of clock cycles to execute an instruction is maintained. The destination records enable the results to be provided as source operands immediately upon completion of execution of the providing instruction. A single source record may be used to specify the architecture register which provides the source operand. The manner in which the source and destination records are used is described below.

To appropriately forward results, the destination record associated with an instruction ("first instruction") executing in one clock cycle may be compared with the source record associated with a subsequent instruction scheduled for execution in the next clock cycle. If a match exists, the result of first instruction is immediately forwarded to the subsequent instruction. The manner in which the source records and destination records may be maintained and results subsequently forwarded are described below with an example.

5. Example

The manner in which the source records and the destination records are populated and maintained are described with reference to FIGS. 3A and 3B. The figures are described with reference to two example instructions-(1) A=B op1 C, and (2) D=E op2 {F, A}, wherein each of op1 and op2 represents an operation. Op1 executes using two operands and Op2 executes using three operands (E, B, and F). Instruction (1) is a providing instruction to dependent instruction (2). For illustration, op1 and op2 are respectively designed for execution in operation units 220-A and 220-B, and variables A–F respectively represent architecture registers 260-A through 260-F.

Figure 3A:
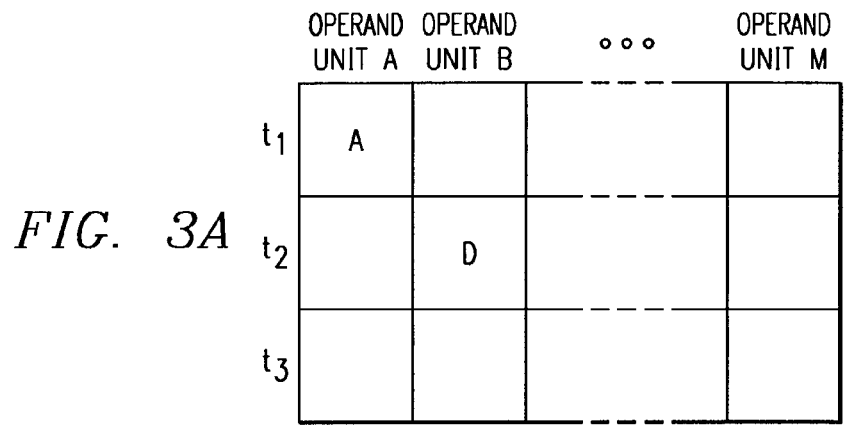
FIG. 3A is a table illustrating the manner in which the destination (second type) record is populated consistent with the data dependencies.

FIG. 3A is a table illustrating the destination records maintained for each operation unit 220-A through 220-M. The rows in the table correspond to three clock cycles t1, t2 and t3 respectively. The columns in the table correspond to operation units 220-A through 220-M respectively.

A scheduler (not shown) populates the destination records based on the scheduling of instructions and the expected time of completion of the instructions. Assuming instruction (1) completes execution at clock cycle T1, the entry corresponding to (t1,A) is populated with 'A' (destination of instruction (1)).

As instruction (2) is dependent on instruction (1), instruction (2) may be scheduled for execution only after availability of result of instruction (1). The present invention enables instruction (2) to be scheduled in the immediate clock cycle, while maintaining the clock period to be short. Thus, assuming that execution of instruction (2) will also be complete within a clock cycle, entry (t2, B) is shown to contain D, the identifier of architecture register 260-D.

Figure 3B:
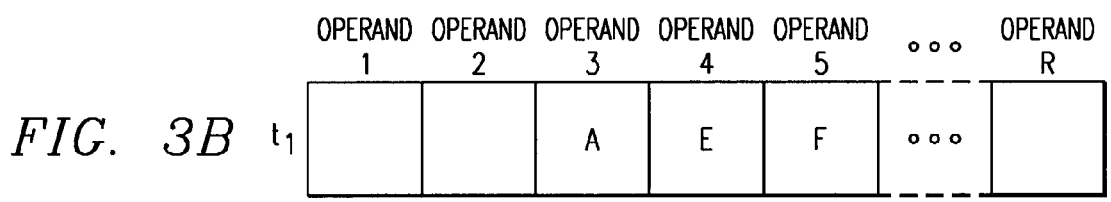
FIG. 3B is a table illustrating the manner in which the source (first type) record is populated.

FIG. 3B is a table illustrating a source record that may be maintained for each operand. The R columns correspond to each of the operands. The entry corresponding to (t1, operand 3) is populated with 'A' as result 'A' (of instruction (1)) is the source of operand 3 (i.e., to multiplexor 210-C) required for execution of instruction (2). Similarly, entries (t1, operand 4) and (t1, operand 5) are shown populated with entries E and F as instruction (2) uses the data in architecture registers 160-E and 160-F as operands.

Forwarding multiplexor 240-C (not shown) forwards the result generated by operation unit 220-A as an operand to operation unit 220-B as the entry (t1, operation unit A) of FIG. 3A is the same as the entry (t1, operand 3) of FIG. 3B. Forwarding is not required for the remaining two operands (4 and 5) of FIG. 3B.

During clock cycle t1, each of the non-blank entries in source record (of FIG. 3B) is compared with all of the entries in the row related to clock cycle t1. A match would exist in situations when data forwarding is required. Thus, the entry at (t1, operand 3) of the source record would match entry (t1, operation unit A) of the destination record. Forwarding multiplexor 240-C would need to forward result 'A' to operation unit 220-B.

Accordingly, control logic 270 would send a value of '00' on 241-C (not shown) to cause the output of operation unit 220-A to be selected by forwarding multiplexor 240-C (not shown). Forwarding multiplexor 240-B would forward the result to operation unit 220-B, and instruction (2) can be executed immediately in clock cycle t2.

In addition, control logic 270 may send a value of 0 for control value 251-A in clock cycle T2 to cause the result in temporary storage unit 230-A to be stored in architecture register 260-A. In clock cycle T3, a value of 1 is sent for control value 251-D (not shown) to cause the results in temporary storage registers 230-B to be stored in architecture registers 260-D. The results in the architecture registers may then be provided to any dependent instructions not requiring forwarding.

From the above, it may be appreciated that a single forwarding multiplexor (one of 240-A through 240-R) may be sufficient to determine the specific result to be forwarded as an operand for an instruction to be executed immediately. As a result, the clock cycle duration may be reduced (at least in comparison to the embodiment of FIG. 1). Accordingly, the instruction throughput performance of execution units may be enhanced.

In the above examples, it is assumed that all instructions take the same duration of time for execution. For some instructions like long 32-bit multiplication instructions, the execution time can be longer. The manner in which the above-described embodiment(s) can be modified to operate with multi-cycle instructions is described below.

6. Multi-Cycle Instructions

Figure 4:
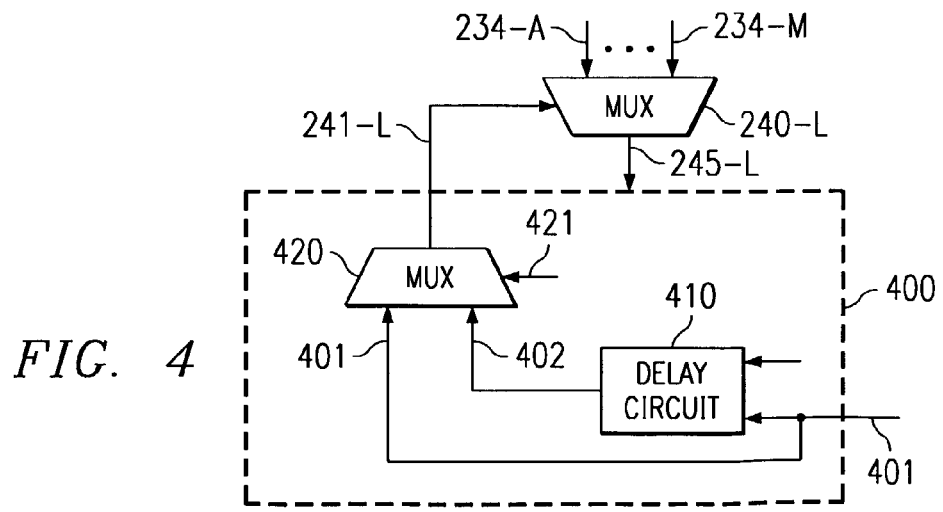
FIG. 4 is a block diagram illustrating an embodiment of delay block implemented in accordance with the present invention.

FIG. 4 is a block diagram illustrating the manner in which execution unit 200 can be modified to support multi-cycle instructions in accordance with the present invention. The modifications can be implemented within control logic 270.

For purpose of illustration, it is assumed that operation unit 220-L executes an operation in two clock cycles and that the corresponding result is to be provided as an operand to operation unit 220-A. Thus, forwarding multiplexor 240-A needs to be provided the corresponding control value (11) one clock cycle later (than in the case of instructions completing execution in one clock cycle).

In an embodiment, the entry in the destination record corresponding to operation unit 230-L is marked with a bit to indicate that the instruction consumes one additional clock cycle. Delay block 400 containing multiplexor 420 and delay circuit 410 can be used to support instructions executing in one or two clock cycles within the respective operation units as described below.

Delay circuit 410 delays control value 401 to generate delayed control value 402. Multiplexor 420 selects either delayed control value 402 or control value 401 depending on the value of control signal 421. Control signal 421 is set to cause delayed control value 402 to be selected when the providing instruction executes in two clock cycles. Control value 401 is caused to be selected otherwise. By delaying control signal 241-A, multiplexor 240-A may effectively wait for the multi-cycle instruction to execute completely before forwarding the result on path 245-A.

In an alternative embodiment, the destination records may be extended to include an additional row each (for the additional clock cycle), and the entries may be populated in the additional row. Control logic 270 may then need to examine the additional entries for match in controlling forwarding multiplexors 240-A through 240-R.

Thus, using the principles described above, execution units providing enhanced instruction throughput performance can be provided. An example system in which such execution units may be implemented is described below.

7. Example System

Figure 5:
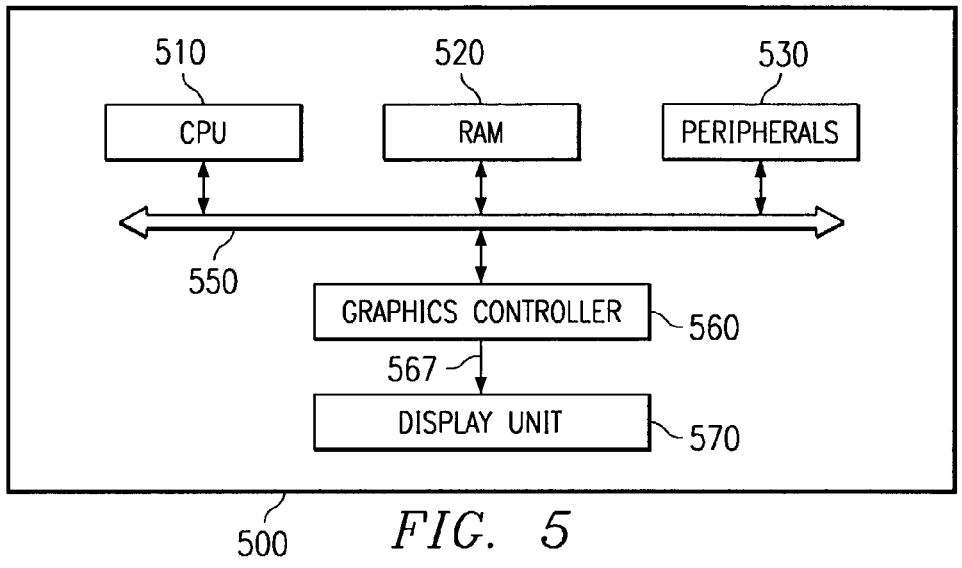
FIG. 5 is a block diagram illustrating the details of an embodiment of a system implemented in accordance with the present invention.

FIG. 5 is a block diagram of computer system 500 illustrating an example environment in which the present invention can be implemented. Computer system 500 includes central processing unit (CPU) 510, random access memory (RAM) 520, one or more peripherals 530, graphics controller 560, and display unit 570. Many components of computer system 500 communicate over bus 550, which can in reality include several physical buses connected by appropriate interfaces.

RAM 520 stores data representing commands and data (including operands for execution of instructions). CPU 510 executes commands stored in RAM 520. Peripherals 530 can include storage components such as hard-drives or removable drives (e.g., floppy-drives). Peripherals 530 can be used to store commands and/or data which enable computer system 500 to operate in accordance with the present invention. Graphics controller 560 receives data/commands from CPU 510, and causes images to be displayed on display unit 570.

The data forwarding technique described above can be implemented within CPU 510. CPU 510 represents a processor implemented in a computer system. However, processors in accordance with the present invention can be implemented in other environments as well. Examples of such environments include (but not limited to) digital signal processors. The details of an implementation of a processor are described below.

8. Processor

Figure 6:
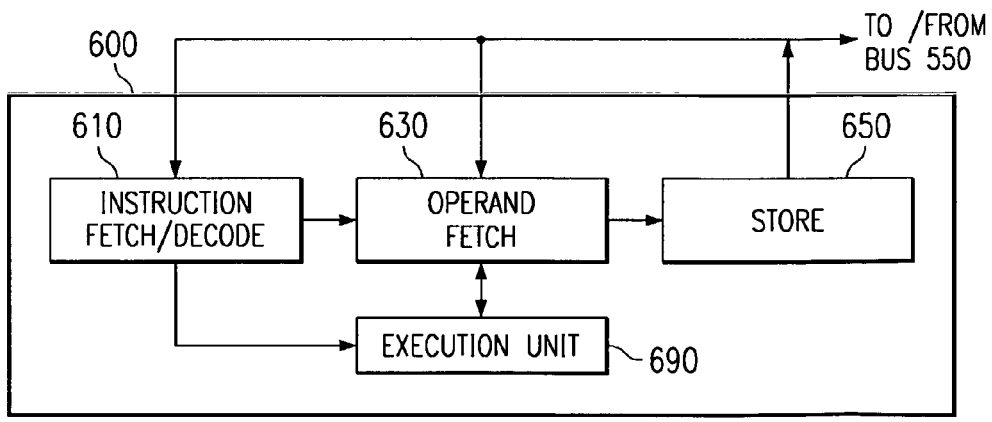
FIG. 6 is a block diagram illustrating the details of an embodiment of a processor implemented in accordance with the present invention.

FIG. 6 is a block diagram illustrating the details of processor 600 in one embodiment. Processor 600 is shown containing instruction fetch/decode 610, operand fetch 630, store 650 and execution unit 690. Processor 600 may correspond to CPU 510, and is described with reference to FIG. 5 for illustration. Each block of FIG. 6 is described below in further detail.

Instruction fetch/decode block 610 receives operation codes on bus 550, and decodes the instruction to determine whether any operation (addition, multiplication, etc.) was initiated. Instruction fetch/decode block 610 may also contain a scheduler which schedules the execution of each instructions. In general, the scheduler determines the expected time of completion of execution of the instructions, and populates the source and destination records described above. The source and destination records may then be used to forward results to the corresponding dependent instructions as described above.

Operand fetch block 630 provides the operands to execution unit 690 to cause a any operation to be initiated. Execution unit 690 may correspond to execution unit 200 of FIG. 2, and generates results in the architecture registers as specified by the instructions. Store block 660 stores the results (in architecture registers) in locations specified by the corresponding store instructions.

Thus, the present invention enables efficient data forwarding and can be used in various processors executing instructions with data dependencies.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. An execution unit executing a plurality of instructions, said execution unit comprising:

a plurality of operation units each executing a corresponding one of said plurality of instructions to generate a corresponding one of a plurality of results on a corresponding one of a plurality of outputs;

a first plurality of registers, wherein each of said plurality of instructions can be specified to store a corresponding result in any of said first plurality of registers, and wherein each of said first plurality of registers comprises an architecture register accessible to a programmer;

a first multiplexor coupled between said plurality of operation units and a first one of said plurality of registers, said first multiplexor receiving said plurality of results on a corresponding plurality of inputs, said first multiplexor storing a result in said first one of said first plurality of registers as specified by a corresponding instruction;

a second multiplexor receiving said plurality of results from between said plurality of outputs and said plurality of inputs, said second multiplexor being implemented to select and forward any one of said plurality of results as an operand for execution of a dependent instruction in a corresponding one of said plurality of operation units; and a control logic, said control logic controlling said second multiplexor and said first multiplexor, said control logic operable to:

maintain a source record table having a column for each operand input for each of said plurality of operation units and a row for each operation unit execution cycle, each entry in said source record table storing an indicator of an architecture register scheduled to supply the corresponding operation unit operand input for the corresponding operation unit execution cycle, maintain a destination record table having a column for each of said plurality of operation units and a row for each operation unit execution cycle, each entry in said destination record table storing an indicator of an architecture register scheduled to store the result for the corresponding operation unit operand for the corresponding operation unit execution cycle, and control said second multiplexor to forward a result generated by one of said plurality of operation units to an operation unit if an indicator in said source record table associated with said operation unit is the same as said indicator in said destination record table for the same execution cycle.

2. The execution unit of claim 1, wherein said source record table and said destination record table are populated when the corresponding instructions are decoded.

3. The execution unit of claim 1, further comprising a delay block delaying a control value to said second multiplexor according to a number of clock cycles required to execute an instruction forwarding an operand for a corresponding dependent instruction.

4. The execution unit of claim 1, wherein said destination record table contains a number of entries corresponding to a maximum number of clock cycles required to execute instructions providing an operand for a corresponding dependent instruction.

5. A system comprising:

a memory storing a plurality of instructions; and a processor executing said plurality of instructions, said processor comprising:

an instruction fetch/decode unit fetching said plurality of instructions from said memory and examining said plurality of instructions;

an execution unit coupled to said instruction fetch/decode unit, said execution unit executing said plurality of instructions, said execution unit comprising:

a plurality of operation units each executing a corresponding one of said plurality of instructions to generate a corresponding one of a plurality of results on a corresponding one of a plurality of outputs;

a first plurality of registers, wherein each of said plurality of instructions can be specified to store a corresponding result in any of said first plurality of registers, and wherein each of said first plurality of registers comprises an architecture register accessible to a programmer;

a first multiplexor coupled between said plurality of operation units and a first one of said plurality of registers, said first multiplexor receiving said plurality of results on a corresponding plurality of inputs, said first multiplexor storing a result in said first one of said first plurality of registers as specified by a corresponding instruction;

a second multiplexor receiving said plurality of results from between said plurality of outputs and said plurality of inputs, said second multiplexor being implemented to select and forward any one of said plurality of results as an operand for execution of a dependent instruction in a corresponding one of said plurality of operation units; and a control logic, said control logic controlling said second multiplexor and said first multiplexor, said control logic operable to:

maintain a source record table having a column for each operand input for each of said plurality of operation units and a row for each operation unit execution cycle, each entry in said source record table storing an indicator of an architecture register scheduled to supply the corresponding operation unit operand input for the corresponding operation unit execution cycle, maintain a destination record table having a column for each of said plurality of operation units and a row for each operation unit execution cycle, each entry in said destination record table storing an indicator of an architecture register scheduled to store the result for the corresponding operation unit operand for the corresponding operation unit execution cycle, and control said second multiplexor to forward a result generated by one of said plurality of operation units to an operation unit if an indicator in said source record table associated with said operation unit is the same as said indicator in said destination record table for the same execution cycle.

6. The system of claim 5, wherein said source record table and said destination record table are populated when the corresponding instructions are decoded.

7. The system of claim 5, further comprising a delay block delaying a control value to said second multiplexor according to a number of clock cycles required to execute an instruction forwarding an operand for a corresponding dependent instruction.

8. The system of claim 5, wherein said destination record table contains a number of entries corresponding to a maximum number of clock cycles required to execute instructions providing an operand for a corresponding dependent instruction.

9. A processor executing a plurality of instructions, said processor comprising:

an instruction fetch/decode unit fetching said plurality of instructions on a bus and examining said plurality of instructions; and an execution unit coupled to said instruction fetch/decode unit, said execution unit executing said plurality of instructions, said execution unit comprising:

a plurality of operation units each executing a corresponding one of said plurality of instructions to generate a corresponding one of a plurality of results on a corresponding one of a plurality of outputs;

a first plurality of registers, wherein each of said plurality of instructions can be specified to store a corresponding result in any of said first plurality of registers, and wherein each of said first plurality of registers comprises an architecture register accessible to a programmer;

a first multiplexor coupled between said plurality of operation units and a first one of said plurality of registers, said first multiplexor receiving said plurality of results on a corresponding plurality of inputs, said first multiplexor storing a result in said first one of said first plurality of registers as specified by a corresponding instruction; and a second multiplexor receiving said plurality of results from between said plurality of outputs and said plurality of inputs, said second multiplexor being implemented to select and forward any one of said plurality of results as an operand for execution of a dependent instruction in a corresponding one of said plurality of operation units; and a control logic, said control logic controlling said second multiplexor and said first multiplexor, said control logic operable to:

maintain a source record table having a column for each operand input for each of said plurality of operation units and a row for each operation unit execution cycle, each entry in said source record table storing an indicator of an architecture register scheduled to supply the corresponding operation unit operand input for the corresponding operation unit execution cycle, maintain a destination record table having a column for each of said plurality of operation units and a row for each operation unit execution cycle, each entry in said destination record table storing an indicator of an architecture register scheduled to store the result for the corresponding operation unit operand for the corresponding operation unit execution cycle, and control said second multiplexor to forward a result generated by one of said plurality of operation units to an operation unit if an indicator in said source record table associated with said operation unit is the same as said indicator in said destination record table for the same execution cycle.

10. The processor of claim 9, wherein said source record table and said destination record table are populated when the corresponding instructions are decoded.

11. The processor of claim 9, further comprising a delay block delaying a control value to said second multiplexor according to a number of clock cycles required to execute an instruction forwarding an operand for a corresponding dependent instruction.

12. The processor of claim 9, wherein said destination record table contains a number of entries corresponding to a maximum number of clock cycles required to execute instructions providing an operand for a corresponding dependent instruction.

* * * * *